United States Patent
Ko

(10) Patent No.: US 6,993,962 B1
(45) Date of Patent: Feb. 7, 2006

(54) ELECTRONIC WIRELESS TIRE PRESSURE MONITORING APPARATUS

(76) Inventor: Yueh-Ying Ko, 5F, No.38, Lane 89, Sinsheng St., Banciao City, Taipei County 220 (TW)

(*) Notice: Subject to any disclaimer, the term of this patent is extended or adjusted under 35 U.S.C. 154(b) by 0 days.

(21) Appl. No.: 11/076,907

(22) Filed: Mar. 11, 2005

(51) Int. Cl.
*B60C 23/02* (2006.01)

(52) U.S. Cl. .................................................. 73/146.5

(58) Field of Classification Search ........ 340/442–449; 73/146, 146.2, 146.3, 146.4, 146.5, 146.8, 73/754, 756

See application file for complete search history.

(56) References Cited

U.S. PATENT DOCUMENTS 5,889,464 A * 3/1999 Huang ........................ 340/442

\* cited by examiner

*Primary Examiner*—William Oen
(74) *Attorney, Agent, or Firm*—Rosenberg, Klein & Lee

(57) ABSTRACT

An electronic wireless tire pressure monitoring apparatus is provided to install on an inflation valve on a tire for a direct signal transmission and a reliable detection. A pressure sensor is configured as a chip type semiconductor sensor and directly wire-bonded to a circuit board. Meanwhile, the pressure sensor is fixed by the pinch pin and the pinch pin holder in place, thereby defining an airtight chamber to allow for an accurate detection of the tire pressure with the pressure sensor. Moreover, the pinch pin and the pinch pin holder are used as electrically conducting means for power supply when the tire pressure detector is screwed on the tire valve. A disconnection is easily achieved when unscrewed. Therefore, the power-saving effect is achieved and no signals are falsely transmitted.

4 Claims, 7 Drawing Sheets

ELECTRONIC WIRELESS TIRE PRESSURE MONITORING APPARATUS

BACKGROUND OF THE INVENTION

1. Field of the Invention

The invention relates to an electronic wireless tire pressure monitoring apparatus, and more particularly, to a monitoring apparatus whose electronic detecting unit and power supply are set outside the tire. Accordingly, the signal transmission, battery renewal and the maintenance can be carried out directly outside the tire.

2. Description of the Related Art

After some time of driving, exposure to the sunlight or the fall of temperature at night, the tire may leak to some extent and the tire pressure will fall down under a normal pressure of 28 psi. It brings a potential danger for the driving safety. Particularly, if one tire of a high speeding vehicle due to the insufficient tire pressure breaks up, the result is very destructive.

Therefore, plenty of researchers have been devoting to developing this kind of detecting and monitoring devices that monitor the tire pressure during driving. Such disclosures include TW 536489, TW 400811, TW 149143, TW 177543, TW 560445, TW 574977, TW 090946, TW 100539, TW 396974, etc. The working principles of above mentioned patents can be divided into electronic detecting and mechanical detecting groups. The life span of the mechanical one is relatively shorter, and the device body is bigger and the detecting precision is not good at the same time. Such kind of mechanical detecting devices is not the object of the invention so that no further descriptions thereto are given hereinafter.

The most popular design of electronic tire pressure detecting apparatus is the hidden mounting construction in the steel wheel rim for the tire. Such kind of apparatus has been disclosed in TW 404354, TW 578706, TW 578707, etc. The advantage of the design is that the tire pressure can be measured directly by the hidden tire pressure monitoring apparatus inside of the tire. The main structure is shown in FIGS. 1 and 2. It consists of a body (11) and a detecting circuit board (12) which is set in the body (11). This circuit board (12) has a signal transmission antenna (13) and two batteries (14) which supply power to this circuit board (12). In the front of the body, an air inlet (15) is mounted. When the above described components are assembled into a tire pressure monitoring apparatus (10) (shown in the FIG. 2), the whole set will be fixed on a steel wheel rim (21) inside of the tire (20). The air inlet (15) penetrates this steel wheel rim (21) and it is fastened by a plate (16) and a screw (17). At last a protecting head (18) will be screwed up and the assembly is finished.

The above mentioned conventional tire pressure monitoring apparatus (10) will transmit a signal through the signal transmission antenna (13), when it detects an abnormal tire pressure. The warning signal will be received by a receiver (not shown in the drawings) in the vehicle and the driver acquires a message about the abnormal tire pressure. However, the signal transmission antenna (13) is mounted in the tire (20), it may be shielded and the signal transmission will be interfered. This leads to an unsatisfying precision and reliability. This is the defect of this mentioned tire pressure monitoring apparatus.

U.S. Pat. No. 5,798,689 discloses another type of tire pressure monitoring apparatus which is mounted inside of the tire. Just like the mentioned one in the above patents, it shows also a hidden design. Another further disadvantage is that the power of this hidden type tire pressure monitoring apparatus is supplied by battery. The battery must be changed frequently due to the limited electricity capacity, but the whole set of tire pressure monitoring apparatus is hidden in the tire and it brings great difficulty and inconvenience to the job of battery changing. By changing the battery, the wheel must be removed firstly from the vehicle, air pressure within the tire has to be released, then the tire must be taken out and the tire pressure monitoring apparatus has to be disassembled. Now the battery can be changed. Thereafter, assembly should be carried out according to the opposite sequence. So, it is very difficult and inconvenient to change the battery.

SUMMARY OF THE INVENTION

It is a primary object of the invention to eliminate the above-mentioned drawbacks and to provide an electronic warless tire pressure monitoring apparatus, especially a monitoring apparatus whose whole electronic detecting devices, pressure sensors and batteries are set outside the tire. It can detect the tire pressure synchronously and the signal transmission antenna is set outside, so that the interference to the signal transmission can be reduced and the signal can be precisely sent to the receiver in vehicle. Therefore, the reliability of tire pressure monitoring will be increased and it ensures a high precision.

It is another object of the invention to set the pressure sensor in an air chamber which directly connects with the tire. In this way, the detecting precision of tire pressure is identical with the one inside of the tire and it brings at the same time convenience for the maintenance. Unlike the prior art that requires additional mechanical element like spring and piston, the invention further has advantages of small volume, insensitive to malfunction and high detection precision.

To achieve the above-mentioned objects, an electronic wireless tire pressure monitoring apparatus is provided to install on an inflation valve on a tire for a direct signal transmission and a reliable detection. A pressure sensor is configured as a chip type semiconductor sensor and directly wire-bonded to a circuit board. Meanwhile, the pressure sensor is fixed by the pinch pin and the pinch pin holder in place, thereby defining an airtight chamber to allow for an accurate detection of the tire pressure with the pressure sensor. Moreover, the pinch pin and the pinch pin holder are used as electrically conducting means for power supply when the tire pressure detector is screwed on the tire valve. A disconnection is easily achieved when unscrewed. Therefore, the power-saving effect is achieved and no signals are falsely transmitted.

When a tire pressure detector is screwed into a tire valve, the pinch pin is pressed against the inflation valve to feed the air within the tire into the airtight chamber such that the current of the first type terminal of the battery passes through the circuit board, the pinch pin holder and the pinch pin to arrive at the tire valve. Thereafter, the current starting from the tire valve returns to the connector of the first housing, and passes through the bottom surface of the first housing to arrive at the circuit board, thereby creating a power supply loop in on state. When the tire pressure detector is unscrewed from the tire valve, an automatic disconnection in off state is achieved.

BRIEF DESCRIPTION OF THE DRAWINGS

The accomplishment of this and other objects of the invention will become apparent from the following descriptions and its accompanying drawings of which.

DETAILED DESCRIPTION OF THE PREFERRED EMBODIMENT

Figure 1:
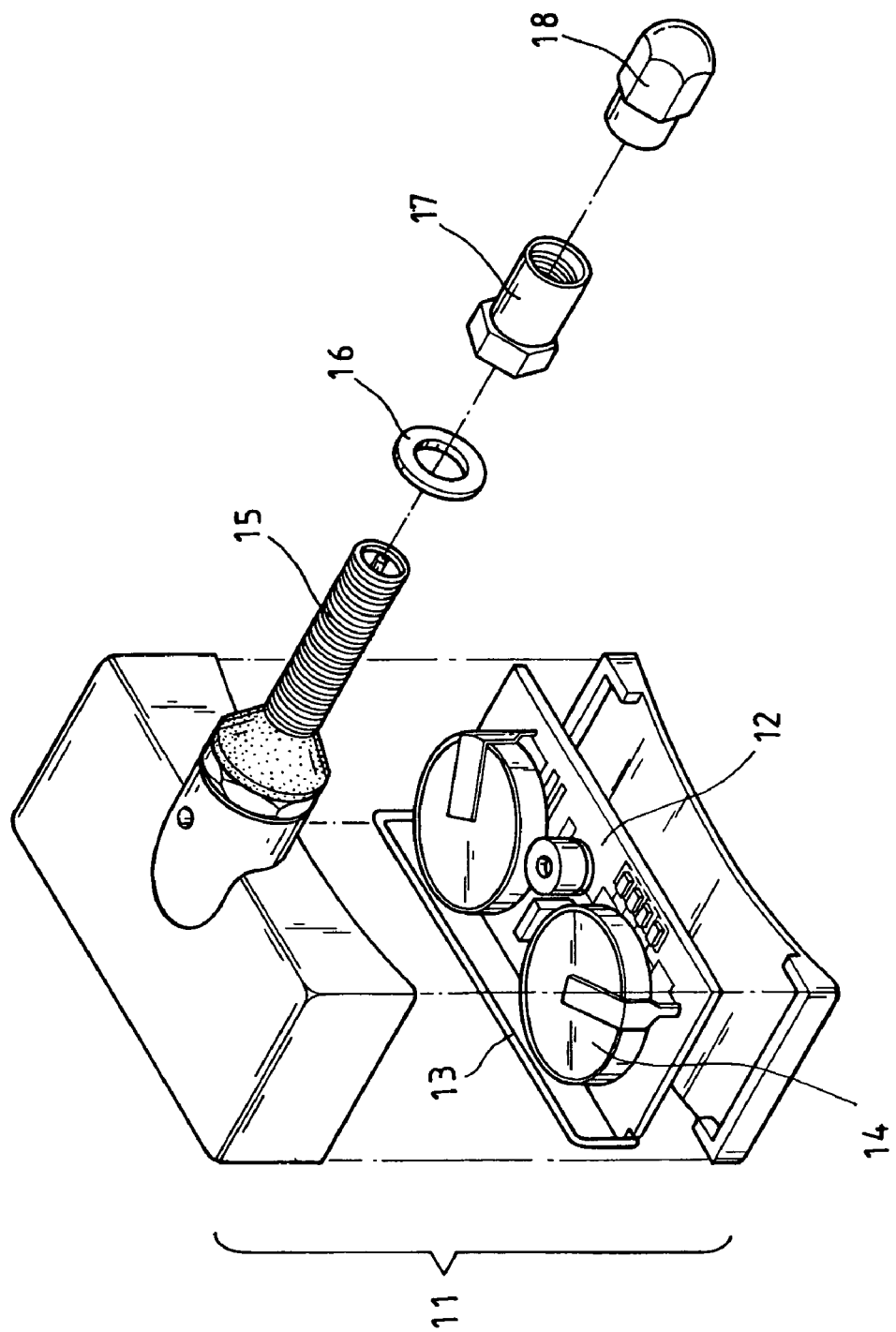
FIG. 1 is a perspective exploded view of a conventional hidden type tire pressure detector.
Figure 2:
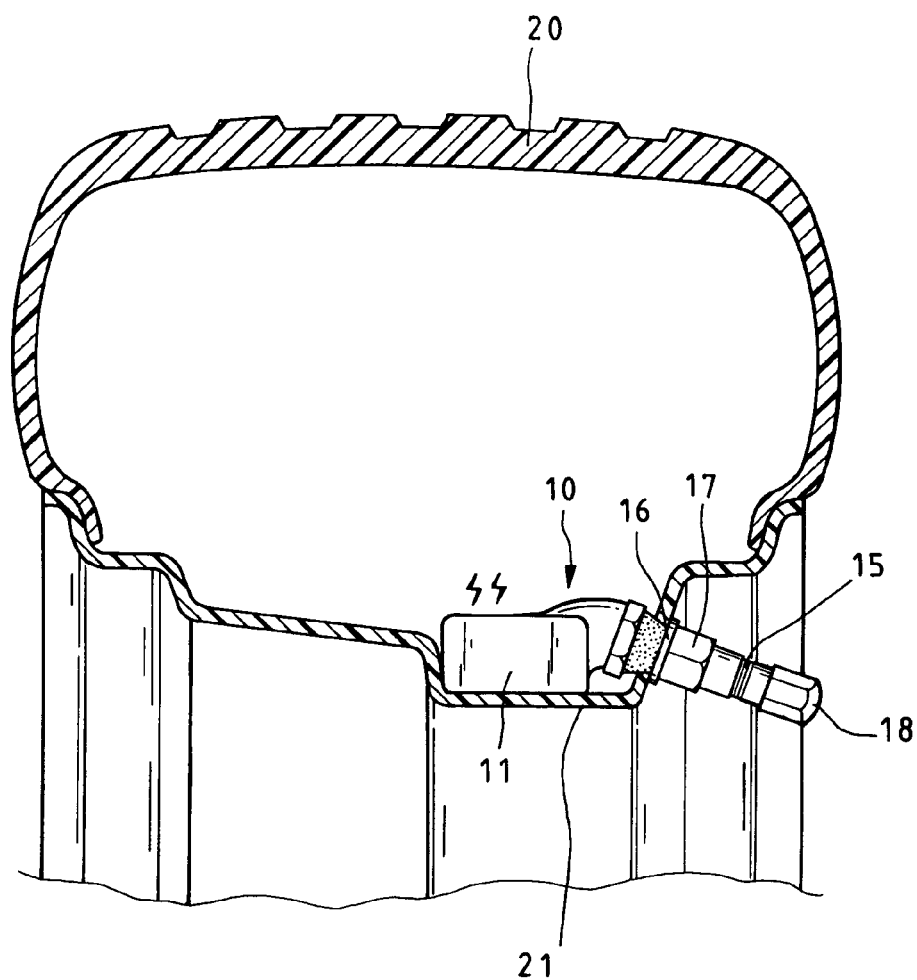
FIG. 2 is a perspective view of the conventional hidden type tire pressure detector after assembly.
Figure 3:
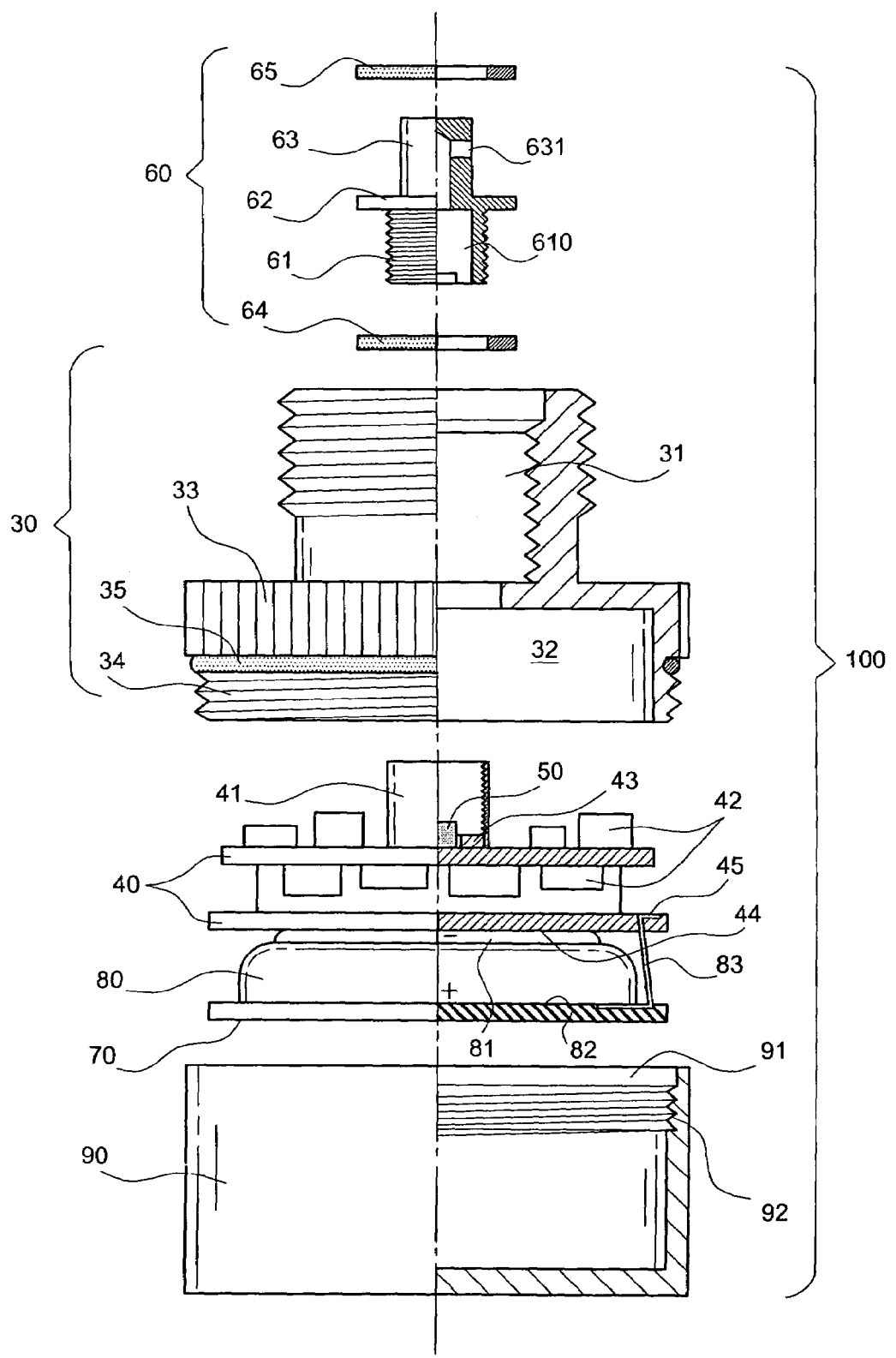
FIG. 3 is an exploded half-sectional view of a tire pressure detector in accordance with the invention.
Figure 4:
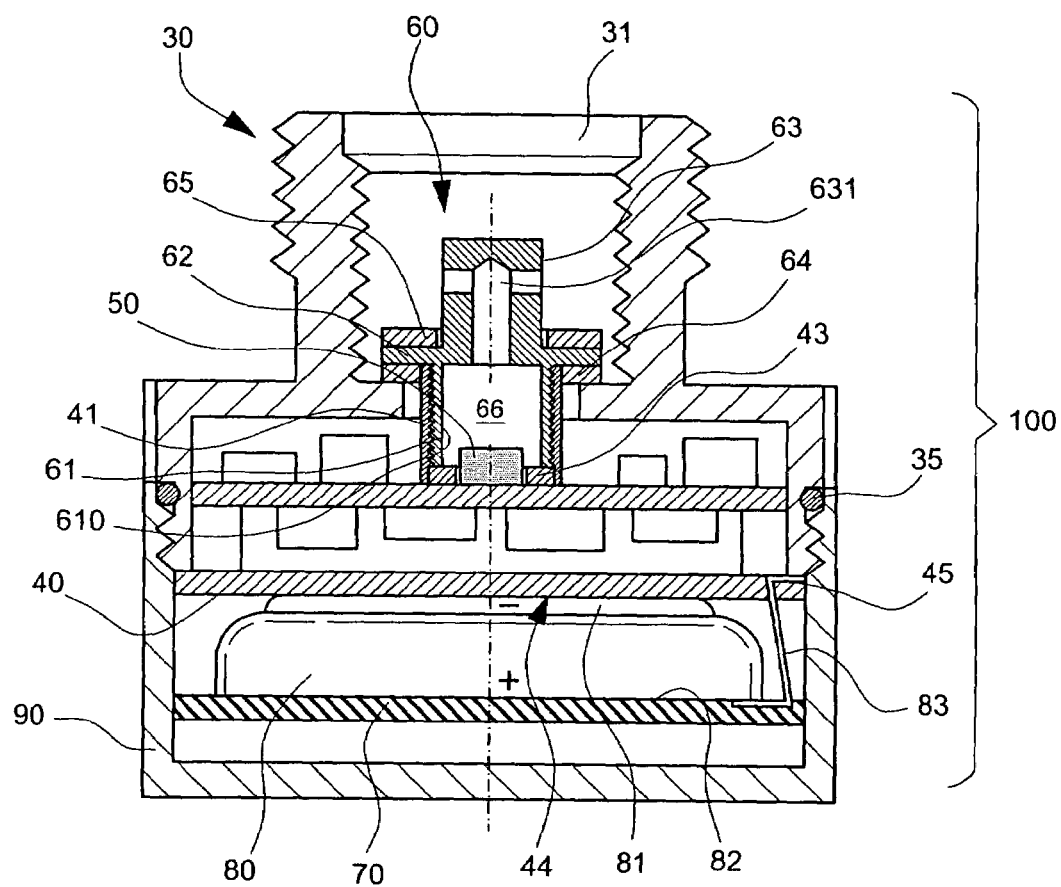
FIG. 4 is a full-sectional view of the tire pressure detector in accordance with the invention after assembly.
Figure 5:
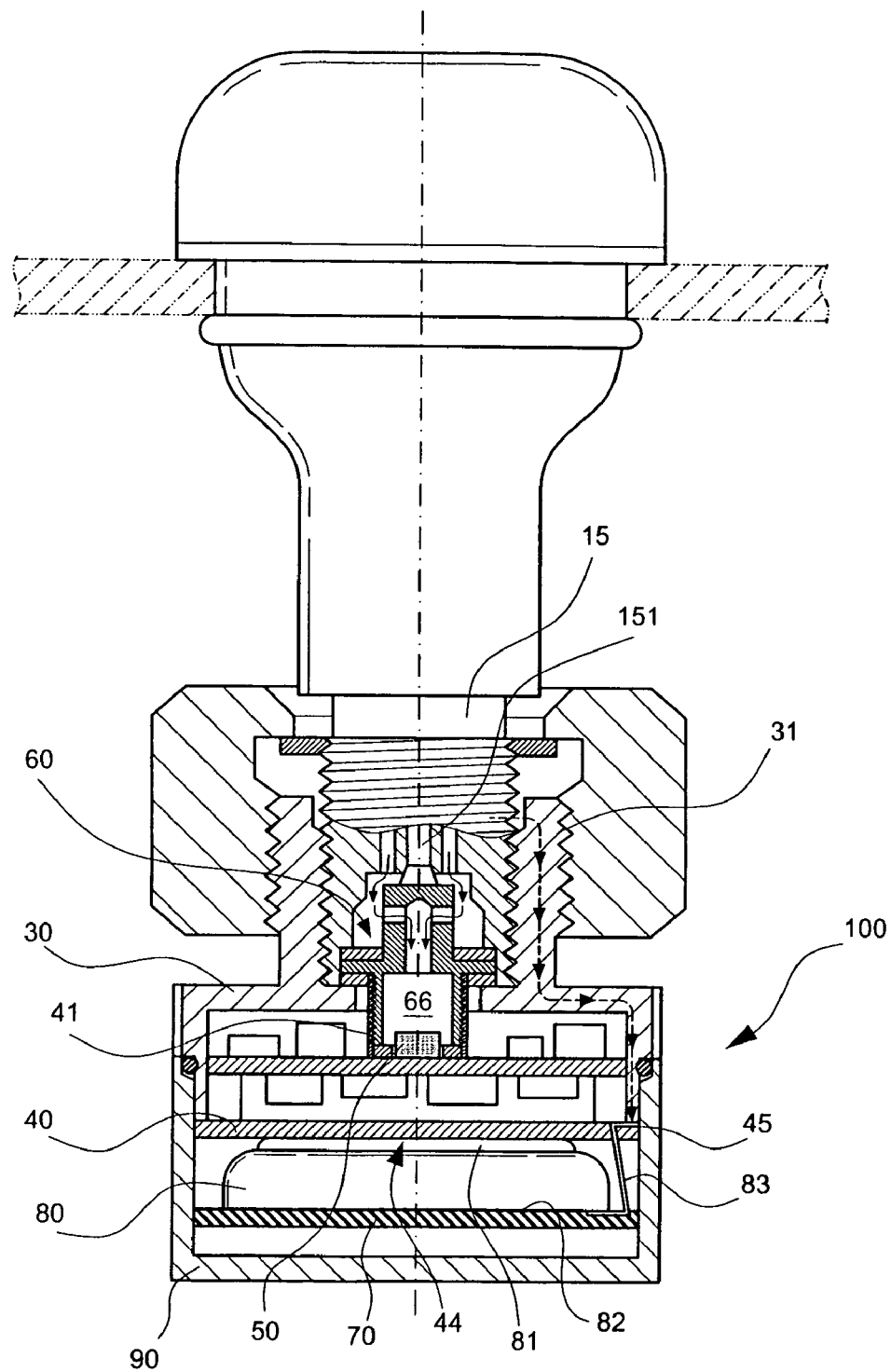
FIG. 5 is a full-sectional view of the tire pressure detector of FIG. 4 that is mounted on a tire valve.

First of all, referring to FIGS. 3 through 5, an electronic wireless tire pressure monitoring apparatus in accordance with the invention includes a first housing 30, a monitoring circuit board 40, a pressure sensor 50, a pinch pin 60, an antenna plate 70, a battery 80, and a second housing 90. The first housing 30 is made of electrically conductive material. The first housing 30 includes a threaded male connector 31 with a contour corresponding to a tire valve. A lower part of the first housing 30 is hollowed out to form a cavity 32 with an opening directed downwards. The lower part with a larger diameter has a rough surface 33 for increasing the frictional force to allow for an easy screwing action and a convenient assembly. However, alternative variants are also possible. A bottom portion under the rough surface 33 is provided with external thread 34 around which an O-ring 35 is mounted.

The monitoring circuit board 40 is preferably configured as a double-layer type, but should not be restricted thereto. The monitoring circuit board 40 is received within the cavity 32. An electrically conductive pinch pin holder 41 is disposed in the center of the monitoring circuit board 40. Meanwhile, the circuit board includes required circuits and components 42.

The pressure sensor 50 is positioned within the pinch pin holder 41 and configured as a chip type semiconductor sensor. Besides, the pressure sensor 50 is electrically coupled to the monitoring circuit board 40 by wire-bonding technology.

The pinch pin 60 is made of electrically conducting material. The pinch pin 60 includes a lower section 61 configured as a hollow 610 with an opening directed downwards, a middle section 62 formed as a flange, and an upper section 63 with at least one through hole 631 at one side thereof to communicate with the hollow 610. In addition, an insulation ring 64 is attached to a bottom end of the middle section 62. In this way, a better airtight effect will be ensured when the pressure sensor 50 is disposed with an airtight chamber 66 defined by the hollow 610 and the pinch pin holder 41 (see FIG. 4). Moreover, a leak-tight ring 65 is mounted on a top surface of the middle section 62.

The antenna plate 70 is electrically coupled to the monitoring circuit board 40 for transmitting signals.

The battery 80 is adapted to supply power required by the monitoring circuit board 40. The battery 80 sitting on a top surface of the antenna plate 70 has a first type terminal 81 (like negative or positive terminal) on a top surface thereof in contact with a first type power contact 44 (like negative or positive terminal) of the monitoring circuit board 40 as well as a second type terminal 82 on a bottom surface thereof that is electrically coupled through a conducting element 83 to a second type power contact 45 of the circuit board 40.

The second housing 90 is preferably made of plastic material and has an opening 91 directed upwards. The second housing 90 is joined to the bottom of the first housing 30 for covering the above-mentioned components. It's preferable that the second housing 90 is, corresponding to the external thread 34, provided with internal thread 92 on the inner wall of the opening 91 to allow for a screwed connection with the first housing 30. In this way, a complete structure of a tire pressure detector 100 in accordance with the invention is created (see FIG. 5). However, the attachment of the first and the second housing 30, 90 is not restricted to the screwed connection. Other equivalent variants are possible under the condition that the stability of the whole structure and the convenience in replacing the battery 80 are taken into account.

FIG. 4 illustrates a tire pressure detector 100 that is still not screwed to a tire valve. At that time, the first type terminal 81 and the second type terminal 81 of the battery 80 are in disconnected state so that the battery 80 is not ready for power supply. So, the consumption of the electric energy can be reduced and no signals are falsely emitted.

Figure 6:
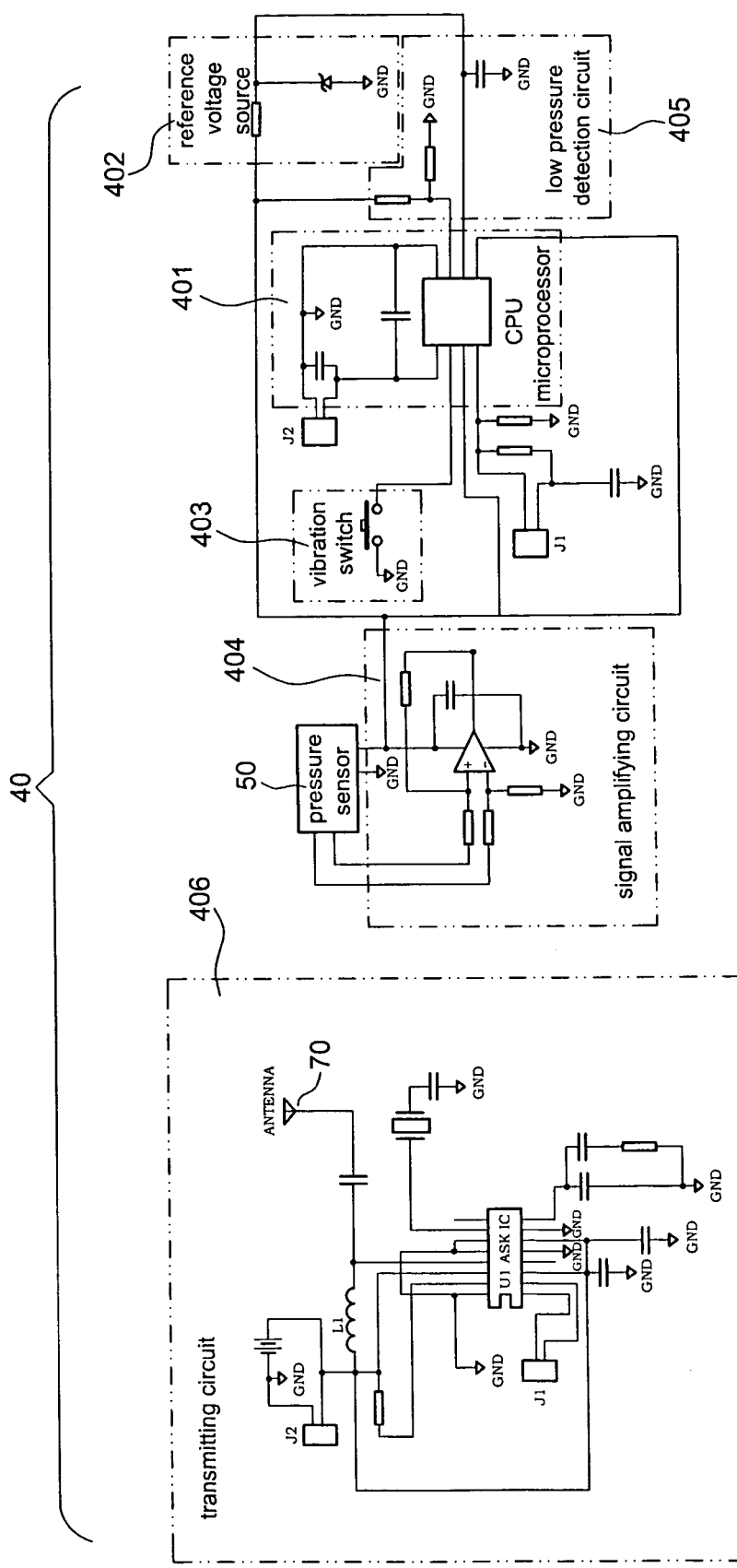
FIG. 6 is a detecting and transmitting circuit diagram of the invention.

FIG. 5 illustrates a tire pressure detector 100 that is screwed into a tire valve 15. At that time, the pinch pin 60 is pressed against the inflation valve 151 to feed the air within the tire into the airtight chamber 66. Thereafter, the current of the first type terminal 81 of the battery 80 passes through the circuit board 40, the pinch pin holder 41 and the pinch pin 60 to arrive at the tire valve 15. Then, the current starting from the tire valve 15 returns to the connector 31 of the first housing 30, and passes in the direction shown by dashed line arrows through the bottom surface of the first housing 30 to arrive at the second type power contact 45 of the circuit board 40, thereby creating a power supply loop in on state. As shown in FIG. 6, the monitoring circuit board 40 includes a microprocessor 401, a reference voltage source 402, a vibration switch 403, a signal amplifying circuit 404, a low pressure detection circuit 405 and a transmitting circuit 406. The pressure sensor 50 is coupled to the signal amplifying circuit 404. When the electronic wireless tire pressure monitoring apparatus of the invention and the car are set into operation, the motor-starting signal will actuate the vibration switch 403, thereby putting the whole monitoring apparatus in operation. The tire pressure value detected by the microprocessor 401 is saved in an internal or an external memory. During the driving process of the car, the transmitting circuit 406 stops to transmit signal, but the monitoring process continues. In setting the pressure value, a plurality of pressure data signals will be transmitted to a receiver within the car. When the car is inactive, the transmission and detection process will stop for a while so that the microprocessor 401 is in a stand-by mode for a power-saving purpose.

Figure 7:
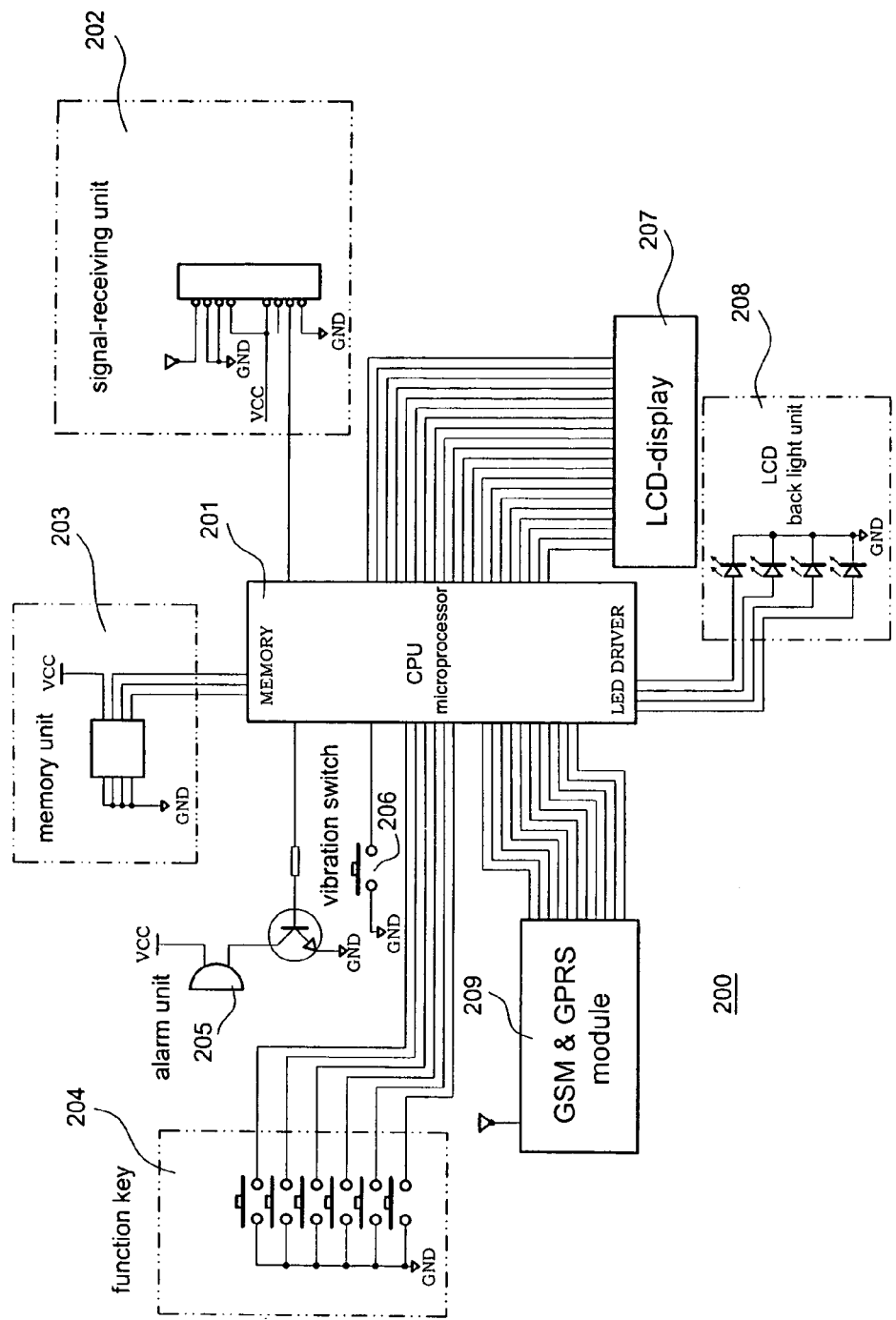
FIG. 7 is a receiving circuit diagram of the invention.

As shown in FIG. 7, a receiving circuit of the receiver 200 includes a microprocessor 201, a signal-receiving unit 202, a memory unit 203, a function key 204, an alarm unit 205, a vibration switch 206, an LCD-display 207, an LCD back light unit 208, and a GSM (abbr. for Global System for Mobile Communications) & GPRS (abbr. for General Packet Radio Service) module 209. The receiving circuit is adapted to receive signals transmitted by the tire pressure detector 100 while the tire pressure value will be indicated on the LCD-display 207. In case of abnormal situation, the alarm unit 205 gives out a warning sound to call attention of the driver to this situation. Alternatively, a warning signal can be transmitted by the wireless communication technology with the GSM & GPRS module 209 to a control center or a certain receiver. In this way, the current situation of the tire pressure can be easily controlled at any time.

FIGS. 6 and 7 illustrate a monitoring circuit diagram and a receiving circuit diagram, respectively. These are well-known to those who are skilled in the art so that no further descriptions thereto are given hereinafter.

Based on the aforementioned technique, the conventional electronic wireless tire pressure gauge can be installed on the external tire valve 15. Besides, the pressure sensor 50 made by a chip type semiconductor is directly wire-bonded to the circuit board 40. Meanwhile, the pressure sensor 50 is fixed by the pinch pin 60 and the pinch pin holder 41 in place, thereby forming the airtight chamber 66 to allow for an accurate detection of the tire pressure with the pressure sensor 50. In addition, the pinch pin 60 and the pinch pin holder 41 are used as electrically conducting means for power supply when the tire pressure detector 100 is screwed on the tire valve 15. A disconnection is easily achieved when unscrewed. Therefore, the power-saving effect is achieved and no signals are falsely transmitted.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claims.

What is claimed is:

1. An electronic wireless tire pressure monitoring apparatus having a tire pressure detector completely installed on an inflation valve of a tire, comprising:
   a) a first housing including a threaded male connector with a contour corresponding to an inflation valve, a lower part of the first housing being hollowed out to form a cavity with an opening directed downwards;
   b) a monitoring circuit board received within the cavity, an electrically conductive pinch pin holder being positioned in the center of the monitoring circuit board;
   c) a pressure sensor positioned within the pinch pin holder and configured as a chip type semiconductor sensor, the pressure sensor being wire-bonded to the monitoring circuit board to allow for an electric connection;
   d) a pinch pin made of electrically conducting material, the pinch pin includes a lower section configured as a hollow with an opening directed downwards, a middle section formed as a flange, and an upper section with at least one through hole at one side thereof to communicate with the hollow, an insulation ring being attached to a bottom end of the middle section, an airtight chamber being defined by the hollow and the pinch pin holder;
   e) an antenna plate electrically coupled to the circuit board for transmitting signals;
   f) a battery mounted on a top surface of the antenna plate, the battery having a first type terminal on a top surface thereof in contact with a first type power contact of the monitoring circuit board as well as a second type terminal on a bottom surface thereof that is electrically coupled through a conducting element to a second type power contact of the circuit board; and
   g) a second housing having an opening directed upwards, the second housing being joined to the bottom of the first housing for covering the above-mentioned components.

2. The electronic wireless tire pressure monitoring apparatus as recited in claim 1 wherein a leak-tight ring is mounted on a bottom surface of the pinch pin holder.

3. The electronic wireless tire pressure monitoring apparatus as recited in claim 1 wherein a leak-tight ring is mounted on a top surface of the middle section of the electrically conducting pinch pin.

4. The electronic wireless tire pressure monitoring apparatus as recited in claim 1 wherein, when a tire pressure detector is screwed into a tire valve, the pinch pin is pressed against the inflation valve to feed the air within the tire into the airtight chamber such that the current of the first type terminal of the battery passes through the circuit board, the pinch pin holder and the pinch pin to arrive at the tire valve whereupon the current starting from the tire valve returns to the connector of the first housing, and passes through the bottom surface of the first housing to arrive at the circuit board, thereby creating a power supply loop in on state; and
   wherein, when the tire pressure detector is unscrewed from the tire valve, an automatic disconnection in off state is achieved.

* * * * *